(12) United States Patent
Piket et al.

(10) Patent No.: US 6,799,062 B1
(45) Date of Patent: Sep. 28, 2004

(54) FULL-DUPLEX HANDS-FREE TRANSPARENCY CIRCUIT AND METHOD THEREFOR

(75) Inventors: James B. Piket, Gilbert, AZ (US); Christopher W. Springfield, Chandler, AZ (US); William C. Yip, Phoenix, AZ (US)

(73) Assignee: Motorola Inc., Schaumburg, IL (US)

( * ) Notice: Subject to any disclaimer, the term of this patent is extended or adjusted under 35 U.S.C. 154(b) by 668 days.

(21) Appl. No.: 09/692,333

(22) Filed: Oct. 19, 2000

(51) Int. Cl.[7] ................................................. H04B 3/20
(52) U.S. Cl. ........................ 455/569; 455/570; 455/961; 455/296; 379/388; 379/406.01; 379/406.16; 379/410
(58) Field of Search ................................. 455/569, 570, 455/554, 561, 296, 575, 67.3, 422, 423, 403, 424–425, 79; 379/388, 389, 410, 411, 406.01, 406.16; 320/286, 287, 288, 299, 292

(56) References Cited

U.S. PATENT DOCUMENTS

| | | | |
|---|---|---|---|
| 3,828,147 A | | 8/1974 | Ochiai et al. |
| 4,476,571 A | | 10/1984 | Tokumo et al. |
| 4,553,257 A | | 11/1985 | Mori et al. |
| 4,608,464 A | | 8/1986 | Morikawa et al. |
| 4,852,161 A | * | 7/1989 | Hagiwara ............... 379/406.05 |
| 5,157,653 A | * | 10/1992 | Genter ........................ 370/288 |
| 5,163,159 A | | 11/1992 | Rich et al. |
| 5,297,198 A | | 3/1994 | Butani et al. |
| 5,353,348 A | | 10/1994 | Sendyk et al. |
| 5,535,433 A | | 7/1996 | Kurokawa et al. |
| 5,544,242 A | | 8/1996 | Robinson |
| 5,548,638 A | | 8/1996 | Yamaguchi et al. |
| 5,579,389 A | | 11/1996 | Wagner et al. |
| 5,631,899 A | | 5/1997 | Duttweiler |
| 5,644,635 A | | 7/1997 | Armbruster |
| 5,668,794 A | * | 9/1997 | McCaslin et al. ............ 370/288 |
| 5,668,871 A | | 9/1997 | Urbanski |
| 5,687,229 A | | 11/1997 | Sih |
| 5,696,819 A | * | 12/1997 | Suizu et al. ............ 379/406.08 |
| 5,721,782 A | * | 2/1998 | Piket et al. .................... 381/66 |
| 5,737,408 A | * | 4/1998 | Hasegawa ............... 379/406.05 |
| 5,970,137 A | * | 10/1999 | Le Damany et al. ... 379/388.01 |
| 6,081,732 A | * | 6/2000 | Suvanen et al. ............. 455/570 |
| 6,147,979 A | * | 11/2000 | Michel et al. ............... 370/292 |
| 6,163,608 A | * | 12/2000 | Romesburg et al. ... 379/406.01 |

(List continued on next page.)

FOREIGN PATENT DOCUMENTS

| | | | | |
|---|---|---|---|---|
| GB | 2316282 A | * | 2/1998 | ............ H04B/3/23 |
| GB | 2349556 A | * | 11/2000 | ............ H04B/3/23 |

*Primary Examiner*—Pablo N. Tran
(74) *Attorney, Agent, or Firm*—Michael C. Soldner; Lawrence J. Chapa

(57) ABSTRACT

A bi-directional hands-free communication device includes a microphone for transmitting a signal along a transmit path and a speaker receiving a signal transmitted along a receive path and outputting a corresponding output signal. An echo canceller, positioned in the transmit path and the receive path, cancels echo signals induced by the microphone from the speaker and outputs a corresponding cancelled signal along the transmit path, and a transparency circuit distributes state-dependent additional loss derived from the noise floor margin to the transmit path and the receive path to reduce residual echo signals output from the echo canceller. The transparency circuit measures a noise floor and inserts an artificial noise signal to the transmit path, and optionally to the receive path, at a predetermined level in relation to the measured noise floor, and dynamically adjusts the speaker to compensate for changing environmental conditions by dividing a range of an expected ambient noise power into adjacent consecutive bins, and controlling a volume of the speaker responsive to ambient noise changes only when measured noise power moves into an adjacent bin.

21 Claims, 2 Drawing Sheets

U.S. PATENT DOCUMENTS

| | | |
|---|---|---|
| 6,181,753 B1 * | 1/2001 | Takada et al. ............... 375/346 |
| 6,185,300 B1 * | 2/2001 | Romesburg ............ 379/406.09 |
| 6,269,161 B1 * | 7/2001 | McLaughlin et al. .. 379/406.01 |
| 6,415,029 B1 * | 7/2002 | Piket et al. ............ 379/406.04 |
| 6,438,225 B1 * | 8/2002 | Tahernezhaadi ....... 379/406.01 |
| 6,526,140 B1 * | 2/2003 | Marchok et al. ....... 379/406.03 |
| 6,580,794 B1 * | 6/2003 | Ono ...................... 379/406.08 |
| 6,622,030 B1 * | 9/2003 | Romesburg et al. ........ 455/570 |

\* cited by examiner

FULL-DUPLEX HANDS-FREE TRANSPARENCY CIRCUIT AND METHOD THEREFOR

FIELD OF THE INVENTION

The present invention pertains to two-way hands-free devices, and more particularly to circuitry and methods for improving the operation thereof.

BACKGROUND OF THE INVENTION

Bi-directional hands-free communication devices include devices such as two-way radios, speaker phones, commonly referred to as "hands-free telephones", and teleconferencing devices and car-kits for cellular telephones, and the like. These hands-free communication devices include a speaker and a microphone, and therefore operation of such devices requires management of signals emitted by the speaker that are subsequently induced by the microphone. These signals, commonly referred to as "echo signals", are a nuisance to users and can in severe cases result in a phenomena known as "howling".

One known method of preventing echo signals is to allow only simplex, or one-way, communication to take place. Typically, simplex systems use a push to talk arrangement, wherein the speaker path is enabled and the microphone path is disabled. Only when the user operates a manual switch is the speaker path disabled and the microphone path enabled, allowing the user to talk to the remote device. Such systems prevent echo signals from developing, but are inconvenient since the user has to press the talk button each time they wish to talk. An additional problem associated with such systems is that the listening party can not interrupt the talking party, but rather must wait for the talking party to release their talk switch.

Echo suppressers and echo cancellers have evolved and are now well known devices for suppressing echo signals automatically. The need for a user to push a button before they talk can thus be eliminated. Echo suppressors automatically suppress the signal in one of the paths to prevent the total gain of both paths from rising above a threshold level. Typically, the first party to talk has the most gain, and the other party's signal is suppressed until the first party stops talking. This type of operation is often referred to as half-duplex Echo cancellers have been developed to provide improved performance, allowing a double talk condition to occur. Echo cancellers employ a filter to estimate the echo signal resulting from the speaker signal that is detected by the microphone. The echo canceller subtracts the echo signal estimate from the signal output by the microphone to produce an echo cancelled signal.

Although echo cancellers work well in some environments, the effective cancellation of echo signals in a hands-free vehicle environment is particularly challenging. Linear recursive filters, such as least means squares (LMS) error minimization, are often used for echo control. However, nonlinear and time-varying system effects, as well as limitations of algorithmic and arithmetic precision, limit the effectiveness of these echo cancellers. As a result, post processing stages are employed to suppress residual echoes. These post processing stages can include post processing procedures such as attenuation of the output signal through gain control or filtering, for example, or other known post signal processes.

However, post processing can result in significant degradation and attenuation of desired transmission signals that are present when both users are speaking simultaneously (double talk condition). The post processing attenuation results in half duplex characteristics, such that only one user can speak at a time. Additionally, post processing typically introduces perceptible changes, or attenuation of the background noise which is present in noisy environments, such as vehicle interiors. This noise variation correlates with speech activity in the signal received at the far end, such that it is objectionable to far-end users. In addition, hands-free units in varying noise environments, such as a vehicle interior, have fixed volume which can be too low or high for a given environment and require manual adjustment.

Accordingly, there is a need for improved control of a hands-free device to improve performance as perceived by both users of the device and remote users communicating with the hands-free device.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

Figure 1:
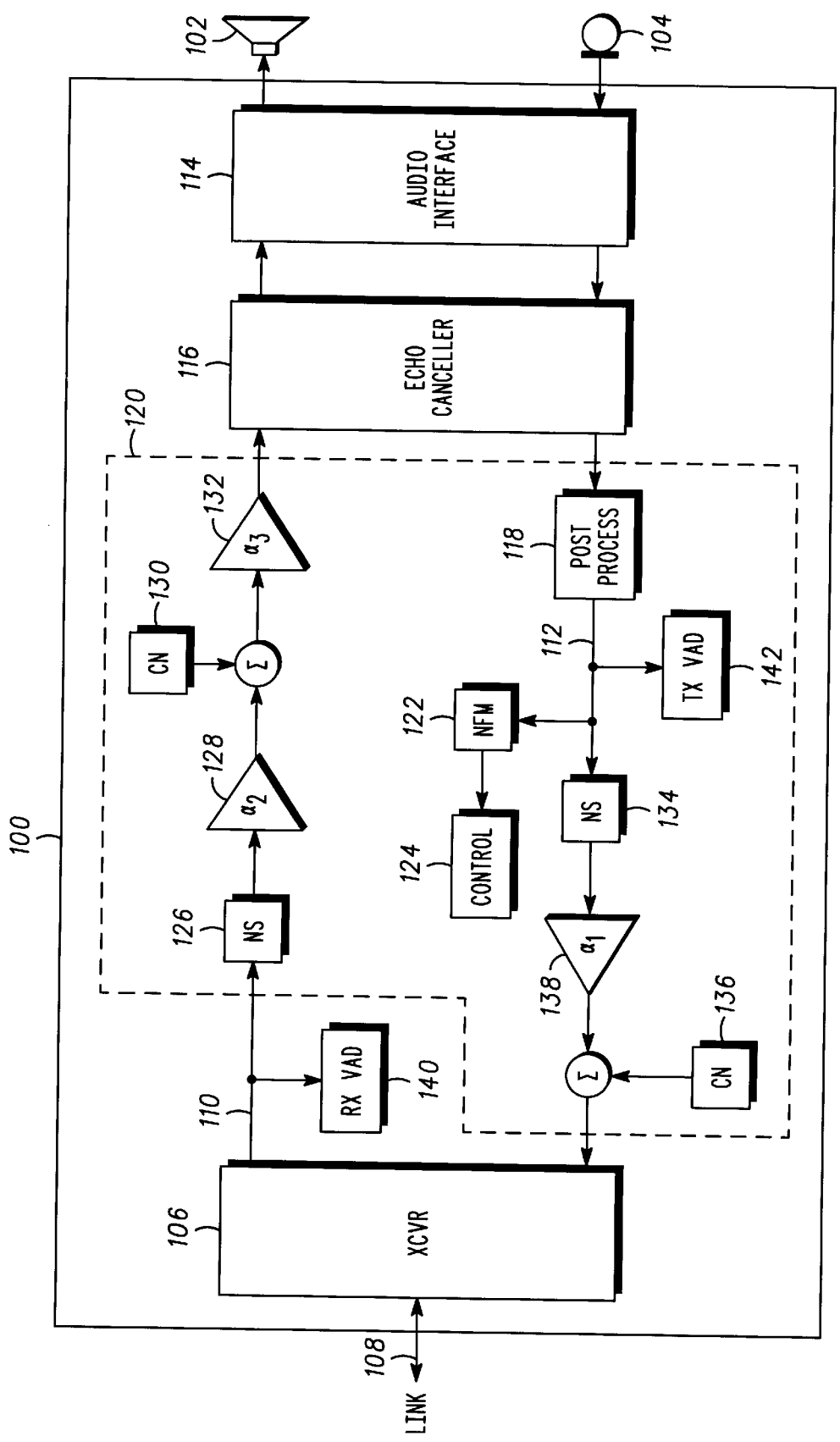
FIG. 1 is a block diagram of a circuit schematic of a hands-free communication device.

As illustrated in FIG. 1, a communication device 100 according to the present invention includes a speaker 102 and a microphone 104 employed for hands-free operation. An audio signal, transmitted from a remote communication device (not shown) is received by a transceiver 106 through a link 108 connected to an antenna (not shown) of the communication device 100. The received audio signal is transmitted along a receive path 110 extending from the transceiver 106 to the speaker 102, which then outputs a resulting output signal. An audio signal input at the microphone 104 is transmitted along a transmit path 112 extending from the microphone 104 to the transceiver 106, and output by the transceiver 106 to the remote communication device along the link 108. The microphone 104 and speaker 102 are connected to an audio interface 114, which, for example, includes buffers, drivers, amplifiers, filters, analog-to-digital and digital-to-analog converters, and other conventional audio interface circuitry (not shown).

The audio interface 114 is positioned between both the speaker 102 and microphone 104 and an echo canceller 116. The echo canceller 116 provides echo cancellation for the transmitted audio signals, and can be implemented using any suitable conventional echo-canceller circuit. For example, according to the present invention, echo canceller 116 is implemented with a post processor 118 and a transparency circuit 120 in a digital signal processor, microprocessor, microcomputer or other suitable processing circuitry. A noise floor margin circuit 122 is connected to the echo canceller 116 to provide a measurement of a residual echo return signal relative to the noise floor for use by a controller 124.

The receive path 110 optionally includes a noise suppression circuit 126, a variable gain amplifier 128, a comfort noise generator 130, and a variable gain amplifier 132. Noise suppression circuit 126 includes a band pass filter to remove high and low frequency noise as well as any direct current (DC) offset from the signal output by a receiver of the transceiver 106.

The variable gain amplifier 128 provides control over loop attenuation to provide echo attenuation. The variable gain amplifier 132 is used to control the volume of speaker 102 in proportion to the ambient noise level, and together with amplifier 128 sets the receive path 110 gain to provide transparent operation. The variable gain amplifier's 132 control of the volume of the speaker 102 is described in greater detail herein below. Although two amplifiers 128, 132 are illustrated, those skilled in the art will recognize that one variable gain amplifier or more than two variable gain amplifiers may also be used.

The transmit path 112 includes the post processor 118, a noise suppression circuit 134, a comfort noise generator 136 and a variable gain amplifier 138. As used herein, "post processing" refers to echo removal techniques used in addition to conventional echo canceller employing an adaptive filter. For example, a non-linear recursive filter can be connected to the output of the echo canceller to further reduce the residual echo signal. Preferably, the post processing circuitry does not significantly degrade or attenuate the desired transmission signals.

The transparency circuit 120 distributes additional loss to both the transmit and received signals in a manner which is not perceptible to the users. The transparency circuit 120 employs a voice activity detector 140 for the receive path 110 and a voice activity detector 142 for the transmit path 112. The voice activity detectors 140 and 142 detect the presence of voice signals in the receive and transmit paths 110 and 112, respectively. Any suitable voice detector can be employed, such as signal-to-noise condition detectors. However, the voice activity detector 142 for the transmit path 112 must accurately discriminate between true transmit voice activity and residual echo signals.

Figure 2:
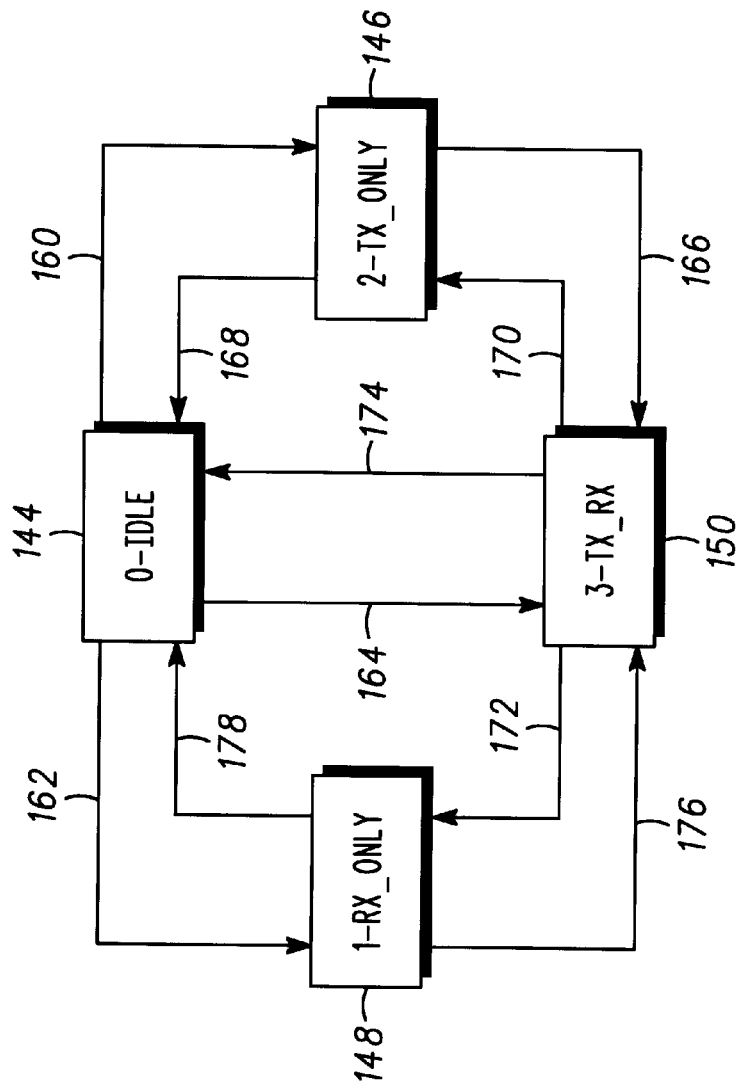
FIG. 2 is a state diagram of the states of a hands-free communication device according to the present invention.

The transparency circuit 120 defines and maintains a current state and a previous state as illustrated in FIG. 2. The transmit voice activity detector 142 indicates whether voice activity is or is not present in the transmit path 112, while the receive voice activity detector 140 indicates whether voice activity is or is not present in the receive path 110. Depending upon the conditions of the transmit and receive voice activity detectors 142 and 140, one of the following four states, illustrated in FIG. 2, is identified: an idle state 144 in which neither transmit nor receive signals are present, a transmit only state 146 in which only transmit signals are present, a receive only state 148 in which only receive signals are present, and a transmit and receive active state 150 in which both transmit and received signals are present. Voice activity detector 142 for transmit path 112 and voice activity detector 140 for receive path 110 control transition from state to state, as shown by the arrow paths in FIG. 2, by determining the presence of voice activity in the respective paths. The resulting state is output and available to the transparency circuit 120.

For example, as illustrated in FIG. 2, when the communication device 100 is in idle state 144 and voice activity detector 142 indicates the presence of voice activity, while voice activity detector 140 does not detect the presence of voice activity, a state transition is made from idle state 144 to transmit only state 146, as indicated by arrow 160, and transmit only state 146 is output and available to transparency circuit 120 as the current state. When communication device 100 is in idle state 144 and voice activity detector 142 indicates that voice activity is not present, while voice activity detector 140 indicates voice activity is present, a state transition is made from idle state 144 to receive only state 148, as indicated by arrow 162, and receive only state 148 is output and available to transparency circuit 120 as the current state.

In the same way, if both voice activity detectors 140 and 142 detect the presence of voice activity when communication device 100 is in idle state 144, a state transition is made from idle state 144 to transmit and receive active state 150, as indicated by arrow 164, and transmit and receive active state 150 is output and available to transparency circuit 120 as the current state. If both voice activity detectors 140 and 142 do not detect the presence of voice activity, the current state output and available to transparency circuit 120 remains idle state 144.

When communication device 100 is in transmit only state 146 and both voice activity detectors 140 and 142 indicate the presence of voice activity, a state transition is made from transmit only state 146 to transmit and receive active state 150, as indicated by arrow 166, and transmit and receive active state 150 is output and available to transparency circuit 120 as the current state. If both voice activity detectors 140 and 142 do not indicate the presence of voice activity, a state transition is made from transmit only state 146 to idle state 144, as indicated by arrow 168, and idle state 144 is output and available to transparency circuit 120 as the current state. If transmit voice activity detector 142 indicates the presence of voice activity and receive voice activity detector 140 does not detect the presence of voice activity, the current state output and available to transparency circuit 120 remains transmit only state 146.

When communication device 100 is in transmit and receive active state 150 and transmit voice activity detector 142 detects the presence of voice activity, while receive voice activity detector 140 does not detect the presence of voice activity, a state transition is made from transmit and receive active state 150 to transmit only state 146, as indicated by arrow 170, and transmit only state 146 is output and available to transparency circuit 120 as the current state. If transmit voice activity detector 142 indicates that voice activity is not present, while receive voice activity detector 140 indicates voice activity is present, a state transition is made from transmit and receive active state 150 to receive only state 148, as indicated by arrow 172, and receive only state 148 is output and available to transparency circuit 120 as the current state. If both receive and transmit voice activity detectors 140 and 142 do not indicate the presence of voice activity, a state transition is made from transmit and receive active state 150 to idle state 144, as indicated by arrow 174, and idle state 144 is output and available to transparency circuit 120 as the current state. If both receive and transmit voice activity detectors 140 and 142 detect the presence of voice activity, the current state output and available to transparency circuit 120 remains transmit and receive active state 150.

Finally, when communication device 100 is in receive only state 148 and both receive and transmit voice activity detectors 140 and 142 indicate the presence of voice activity, a state transition is made from receive only state 148 to transmit and receive active state 150, as indicated by arrow 176, and transmit and receive active state 150 is output and available to transparency circuit 120 as the current state. If both receive and transmit voice activity detectors 140 and 142 do not indicate the presence of voice activity, a state transition is made from receive only state 148 to idle state 144, as indicated by arrow 178, and idle state 144 is output and available to transparency circuit 120 as the current state. If transmit voice activity detector 142 does not indicate the presence of voice activity, and receive voice activity detector 140 indicates the presence of voice activity, receive only state 148 is output and available to transparency circuit 120 as the current state.

Using the current states as determined by transmit and receive voice activity detectors 142 and 140, the controller 124 coordinates the transparency operation using amplifiers 128, 132 and 138. The controller 124 maintains and utilizes several signal parameters, including signal power and noise floor estimates.

The power of signal y is defined as:

$$P_y(n)=(1-\gamma)y^2(n)+\gamma P_y(n-1),$$

where $\gamma$ is constant less than one, and may for example be close to one, such as 0.9875, and n is the sampling instant. Such power measurements are generated for both the transmit path 112 and the receive path 110.

The noise floor is a slow rise fast fall estimate calculated according to the following algorithm:

if $P_y(n) > NF_y(n-1)$,
then $NF_y(n) = \beta NF_y(n-1)$, where $\beta$ corresponds to a 3 db per second rise rate,
else $NFy(n) = Py(n)$.

Thus, the noise floor can rise at a rate no greater than 3 db per second, but falls to the instantaneous signal measurement if the instantaneous measurement is lower than the current noise floor. The ramping rates may vary between 2 to 8 dB depending on the application. For example, it is envisioned that voice activated devices will require faster ramps of 4 to 8 dB/s whereas comfort noise trackers will use a slower rate of 2 to 4 dB/s.

In addition to the signal power and noise floor estimate, the controller 124 also measures a noise floor margin (NFM) in noise floor margin circuit 122. The noise floor margin is a power measure of the noise floor relative to the residual echo. An additional noise floor measurement worst case (NFM_WC) metric tracks the NFM with an activity dependent slow rise, fast fall algorithm. This noise floor margin measurement represents a worse case estimate of the noise floor to residual echo power just prior to processing by the transparency circuit 120. The noise floor margin (NFM) is defined as:

$$NFM(n) = \frac{NF_e(n)}{P_e(n)}$$

Noise floor margin worst case (NFM-WC):

if (CUR_STATE=RX_ONLY)
   if NFM(n)>NFM_WC(n-1)
     then NFM_WC(n) = β NFM_WC(n-1)
     where typical β corresponds to 3 dB/s rise rate
   else
     NFW_WC(n)=NFM(n)
else NFM_WC(n) = NFM_WC(n-1).

The transparency circuit 120 serves to distribute additional loss needed to mask any remaining residual echo. Additional loss is applied in attenuation stages provided by amplifiers 128 and 138. The transparency circuit 120 is based on the perception that within a certain range, a listener does not notice, or object to, a signal that appears with a fixed loss in power. However, when an active signal experiences a sudden change in power, it is perceptually more noticeable and objectionable to the listener.

If neither signal is active, or only the transmit signal is active, no additional loss is required as there is no echo to suppress. If only the receive signal is active, the transparency circuit applies the necessary loss to the transmit signal to reduce residual echo. However, when both parties are talking, the majority of the loss is applied to the second party to talk. This party is the interrupting party. In this manner, the previously active signal does not experience a dramatic drop in signal power. The interrupting signal appears at a reduced level. The appearance of the interrupting signal even at a lower power, is perceptually more transparent than if a significant loss is introduced to an already active signal. If the conversation then transitions to exclusively transmit activity or to no signal activity, the attenuation can be removed in a gradual manner. If the conversation transitions exclusively to receive activity, the total loss can be applied to the transmit signal.

The remaining components in the transparency circuit 120 consist of a noise suppression (NS) and comfort noise (CN) processes. As the additional losses in attenuator stages $\alpha1(n)$ and $\alpha2(n)$, resulting from amplifiers 138 and 128, respectively, are applied, the background noise in the corresponding signal will be attenuated as well. This effect is commonly referred to as noise modulation and becomes apparent in even moderately noisy signals. While it is envisioned that stages $\alpha1(n)$ and $\alpha2(n)$ loses are limited such that noise modulation is fairly minimal, noise floor movement during exclusive receive signal activity is particularly apparent. As the far end user speaks, most practical systems apply a fair amount of attenuation to the transmit signal to suppress residual echo. The far end user subsequently hears noise modulation directly correlated with their speech activity.

Conventional attempts to eliminate noise modulation center primarily on inserting artificial noise, often referred to as comfort noise, during periods of transmit attenuation. Through careful energy and spectrum matching this has provided some improvement. However, according to the present invention, introducing an ever-present comfort noise signal that is near the actual background noise, eliminates any perceived noise modulation. According to the present invention, this artificial noise floor is continuously combined with the attenuator output provided by amplifiers 128 and 138. By superimposing the artificial noise floor near the true signal, any movement of the natural noise floor is masked by the artificial noise floor.

There are numerous advantages to the artificial noise floor technique of the present invention. First, while spectral matching improves the artificial noise floor masking properties, the artificial noise floor technique of the present invention is considerably less sensitive to spectral mismatch than other approaches. In fact, most systems can predetermine a desirable spectral shape for the artificial noise. This eliminates costly dynamic noise modeling needed by conventional systems. Secondly, the artificial comfort noise floor technique simplifies energy matching and eliminates transition artifacts experienced by many systems. Thirdly, the additional noise also serves to mask residual echo. The transparency circuit processes the transmit path and optionally the receive path with suitable noise suppression. The artificial noise floor can be referenced to the new lower noise floor as appropriate.

It should be noted that the principles used for the transparency circuit attenuation can be made to operate independently of noise suppression and comfort noise functions. If high noise is typically not a factor for a given signal, or resource limitations are prohibitive, these components may be eliminated from one or both of the signal paths. For example, many systems will operate well with no comfort noise and noise suppression in the receive signal path.

To sufficiently mask residual echo signals, the echo signals must be suppressed to some level below the noise floor. An Additional Loop Loss (ALL) equation quantifies the additional loss to be inserted by the transparency circuit 120 based on the noise floor margin worst case NFM_WC as follows:

$$ALL(n) = NFM\_WC(n) \cdot \zeta.$$

Here, NFM_WC(n) provides the additional attenuation required in order to lower residual echo to the natural noise floor, and $\zeta$ represents an additional factor to further adjust the attenuation. The value of $\zeta$ is strongly dependent on the system sensitivity as well as noise suppression configuration and performance, but a typical $\zeta$ would correspond to an additional 10 dB loss.

Echo is not readily perceived when both parties are speaking. As a result, ALL(n) can be adjusted for this situation using the following algorithm:

if (CUR_STATE=TX_RX)

$$ALL(n) = ALL(n) \cdot DTF$$

where DTF typically corresponds to a 6 dB gain.

The transparency circuit has now determined the total additional loss required to suppress any residual echo and the above described attenuation strategy is applied for loss distribution. The individual path attenuation values can now be calculated in the following manner:

```
if (CUR_STATE == IDLE)
    α₁(n) = 0
    α₂(n) = 0
end
if (CUR_STATE == TX_ONLY)
    α₁(n) = 0
    α₂(n) = 0
end
if (CUR_STATE == RX_ONLY)
    α₁(n) = ALL(n)
    α₂(n) = 0
end
if (CUR_STATE == TX_RX)
    if (PRE_STATE == RX_ONLY)
        α₁(n) = φ * All(n)
        α₂(n) = (1-φ) * All(n)
    else
        α₁(n) = (1-φ) * All(n)
        α₂(n) = φ * All(n)
    end
end
```

The value $\phi$ serves to distribute the majority of loss to the interrupting signal upon double-talk onset, where a typical $\phi$ is 0.75, for example. The value $\phi$ should be interpreted as distributing the total logarithmic loss (dB) in the above equations. It should also be noted that the values calculated above represent the "goal" for a given attenuator stage. The actual applied attenuation will be graduated to improve transition transparency. Typical additional attenuation should be completed within a few milliseconds, and attenuation removal can be graduated over the course of a second.

The attenuation and artificial noise floor insertion can now be applied to produce the transparency circuit output signals.

$$tx(n) = \alpha_1(n) \cdot eb(n) + \rho_1 \cdot CN(n)$$

$$rx(n) = \alpha_2(n) \cdot xb(n) + \rho_2 \cdot CN(n)$$

The scaling factors $\rho_1$ and $\rho_2$ are applied to position the artificial noise floor.

The algorithms described herein represent a compact implementation utilizing the benefits of perceptually weighted loss distribution based on signal activity states and artificial noise floor insertion. It is understood that similar strategies can be developed, such as attenuation look up tables, that are still principally derived for the aforementioned techniques. The claims are intended to cover all such related strategies.

According to another aspect of the present invention the volume of the speaker 102 is dynamically adjusted to compensate for changing environmental conditions. A scaling factor is generated based on the power of the ambient noise of the environment. The range of the expected ambient noise power is divided into "bins" for generation of a scaling mark. Multi-stage hysterises is used to prevent rapid changes to the scaling mark, and therefore changes to the loudspeaker volume, when the ambient conditions are near a boundary.

Once the scaling mark is determined, a ramping function is applied to prevent instantaneous changes in loudspeaker volume. Separate ramping rates are provided for increasing and decreasing volume to match perceptual properties of the user. Combination of the ramping function and the scaling mark produces the scaling factor, which is combined with other scaling factors for the loudspeaker (volume setting, for example) and applied to the signal as $\alpha_3(n)$ in variable gain provided by amplifier 132.

At system initialization, or when the volume compensation is enabled, the scaling mark is set to its initial value. This value is chosen to represent conditions which are most probable at system initialization. At the same time, the system begins to track the ambient noise (noise floor) of the hands-free environment.

At a defined interval, such as the frame rate, the noise floor power associated with the measured noise floor is compared to the thresholds for the next higher and next lower bin's threshold, limiting maximum and minimum values. The scaling mark is never incremented or decrement more than one bin. This slows the movement of the volume setting so that volume changes are transparent to the user.

Multistage hysterisis is produced by requiring the noise floor to either rise above the threshold for the next higher bin, or below the threshold for the next lower bin in order for the scaling mark to change. Therefor there is no variation in the scaling mark when the noise floor is near a bin threshold. For a subsequent change of the scaling mark, the noise floor power must either rise above the next higher threshold or below the next lower threshold.

Once the scaling mark is determined, the ramping rates are applied to produce the final scaling factor. To accomplish this, a target scaling factor is determined for each scaling mark. This target is the final value to which the scaling factor will converge if there are no changes to the scaling mark. The rate of convergence is based on the ramping rate. The scaling factor is updated on the frame interval. If the current scaling factor is above the target value, the "down" rate is used to generate the new scaling factor. If the current scaling factor is below the target value, the "up" rate is used to generate the new scaling factor.

The number of bins used for the scaling mark and the target scaling factor can be varied to suit the particular application. Some applications may have narrower ambient operating range, thus requiring fewer bins and less extreme scaling factors. Other applications may have extreme operating ambient conditions, such that a greater number of bins and more extreme scaling factors are required in order to provide operation transparent to the user. These changes to the system only require changing the bin thresholds and the target scaling factors, making this algorithm easily scaleable.

The present invention thus provides a flexible system that can be scaled to different variation rates by making more or fewer bins. Additionally, it can be seen that a smooth ramping function is in the scaling factor even with rapid changes in the noise floor can be provided. Smoothing is provided by the multi-stage hysterisis and ramping function.

In addition to providing a pleasant volume for the user over a wide range of noise environments, this dynamic volume control plays an important role in echo control. The echo masking properties of noise are significant. Therefor, in quiet environments, echo becomes more difficult to mask. The dynamic volume control of the present invention reduces the residual echo in quiet environments thereby improving the full duplex characteristics. Increased volume is applied in increased noise environments where echo is more readily masked, and doesn't have an impact on the transparency Additionally it can be seen that the present invention provides an improved transparency for full-duplex hands-free communication for all practical systems where additional loss is required for echo control and suppression. In addition, the present invention significantly reduces the perceived noise modulation associated with such signal loss using less complexity than prior systems.

The echo signal control of the present invention control permits the use of post processing but operates to significantly improve full-duplex characteristics of hands-free operation and minimizes perceived noise variations while still providing echo cancellation. The echo canceller full duplex transparency circuit monitors the performance of the echo canceller and dynamically distributes additional losses in the transmit and receive paths in a manner optimized for perceptual transparency. Additionally, an artificial noise floor is introduced having a magnitude near the background noise level to provide additional echo masking. Further, dynamic environment compensation is provided for loudspeaker control.

While a particular embodiment of the present invention has been shown and described, modifications may be made. It is therefore intended in the appended claims to cover all such changes and modifications which fall within the true spirit and scope of the invention.

We claim:

1. A bi-directional hands-free communication device, comprising:
    a microphone for transmitting a signal along a transmit path;
    a speaker receiving a signal transmitted along a receive path and outputting a corresponding output signal;
    an echo canceller, positioned in the transmit path and the receive path, cancelling echo signals induced by the microphone from the speaker and outputting a corresponding cancelled signal along the transmit path; and
    a transparency circuit distributing additional loss to the transmit path and the receive path to reduce residual echo signals output from the echo canceller, the transparency circuit comprising a first voice activity detector and a second voice activity detector, the first voice activity detector detecting signals in the transmit path and the second voice activity detector detecting signals in the receive path, wherein the present distribution of the additional loss is dependent on both a previous and a current voice activity state of the transmit path and the receive path.

2. A bi-directional hands-free communication device comprising:
    a microphone for transmitting a signal along a transmit path;
    a speaker receiving a signal transmitted along a receive path and outputting a corresponding output signal;
    an echo canceller, positioned in the transmit path and the receive path, cancelling echo signals induced by the microphone from the speaker and outputting a corresponding cancelled signal along the transmit path; and
    a transparency circuit distributing additional loss to the transmit path and the receive path to reduce residual echo signals output from the echo canceller, wherein the transparency circuit measures a noise floor and inserts an artificial noise signal to the transmit path at a predetermined level in relation to the measured noise floor.

3. The bi-directional hands-free communication device of claim 2, wherein the transparency circuit inserts an artificial noise signal to the receive path at a predetermined level in relation to the measured noise floor.

4. A bi-directional hands-free communication device comprising:
    a microphone for transmitting a signal along a transmit path;
    a speaker receiving a signal transmitted along a receive path and outputting a corresponding output signal;
    an echo canceller, positioned in the transmit path and the receive path, cancelling echo signals induced by the microphone from the speaker and outputting a corresponding cancelled signal along the transmit path;
    a transparency circuit distributing additional loss to the transmit path and the receive path to reduce residual echo signals output from the echo canceller; and
    a first voice activity detector and a second voice activity detector, the first voice activity detector detecting signals in the transmit path and the second voice activity detector detecting signals in the receive path, wherein the transparency circuit distributes the additional loss to the transmit path in response to signals being detected only in the receive path.

5. The bi-directional hands-free communication device of claim 4, wherein a majority of the additional loss is distributed to a path corresponding to an interrupting party in response to signals being detected in both the transmit path and the receive path.

6. The bi-directional hands-free communication device of claim 5, wherein the additional loss distributed to the path corresponding to the interrupting party is gradually removed, either in response to signals being subsequently detected only in the transmit path, or in response to signals subsequently not being detected in the transmit path and the receive path.

7. The bi-directional hands-free communication device of claim 5, wherein the additional loss is distributed to the transmit path in response to signals being subsequently detected only in the receive path.

8. A bi-directional hands-free communication device comprising:
- a microphone for transmitting a signal along a transmit path;
- a speaker receiving a signal transmitted along a receive path and outputting a corresponding output signal;
- an echo canceller, positioned in the transmit path and the receive path, cancelling echo signals induced by the microphone from the speaker and outputting a corresponding cancelled signal along the transmit path; and
- a transparency circuit distributing additional loss to the transmit path and the receive path to reduce residual echo signals output from the echo canceller, wherein the transparency circuit dynamically adjusts the speaker to compensate for changing environmental conditions by dividing a range of an expected ambient noise power into adjacent consecutive bins, and controlling a volume of the speaker responsive to ambient noise changes only when measured noise power moves into an adjacent bin.

9. The bi-directional hands-free communication device of claim 8, wherein the volume of the speaker is increased when the noise power moves into an adjacent higher bin during a sampling interval.

10. The bi-directional hands-free communication device of claim 9, wherein the volume of the speaker is decreased when the noise power moves into an adjacent lower bin during a sampling interval.

11. The bi-directional hands-free communication device of claim 8, wherein a scaling mark is generated based on the dividing of the range of the expected ambient noise power into adjacent consecutive bins, and multi-stage hysterises is used to prevent rapid changes to the scaling mark.

12. A bi-directional hands-free communication device, comprising:
- a microphone for transmitting a signal along a transmit path;
- a speaker receiving a signal transmitted along a receive path and outputting a corresponding output signal;
- an echo canceller, positioned in the transmit path and the receive path, cancelling echo signals induced by the microphone from the speaker and outputting a corresponding cancelled signal along the transmit path;
- a transparency circuit distributing additional loss to the transmit path and the receive path in response to residual echo signals output from the echo canceller;
- a noise floor margin circuit coupled to the echo canceller along the transmit path measuring a noise floor margin corresponding to a relationship between the residual echo signal output by the echo canceller and a noise floor;
- a controller, coupled to the noise floor margin circuit, calculating the additional loss, based on the noise floor margin, required to suppress residual echo; and
- a comfort noise generator inserting artificial noise to the receive path at a predetermined level in relation to the noise floor.

13. The bi-directional hands-free communication device of claim 12, wherein the distributing of the additional loss is state dependent.

14. The bi-directional hands-free communication device of claim 12, further comprising a first voice activity detector and a second voice activity detector, the first voice activity detector detecting signals in the transmit path and the second voice activity detector detecting signals in the receive path, wherein the transparency circuit distributes the additional loss to the transmit path in response to signals being detected only in the receive path.

15. The bi-directional hands-free communication device of claim 14, wherein a majority of the additional loss is distributed to a path corresponding to an interrupting party in response to signals being detected in both the transmit path and the receive path.

16. The bi-directional hands-free communication device of claim 15, wherein the additional loss distributed to the path corresponding to the interrupting party is gradually removed, either in response to signals being subsequently detected only in the transmit path, or in response to signals subsequently not being detected in the transmit path and the receive path.

17. The bi-directional hands-free communication device of claim 15, wherein the additional loss is distributed to the transmit path in response to signals being subsequently detected only in the receive path.

18. The bi-directional hands-free communication device of claim 12, wherein the transparency circuit dynamically adjusts the speaker to compensate for changing environmental conditions by dividing a range of an expected ambient noise power into adjacent consecutive bins, and controlling a volume of the speaker responsive to ambient noise changes only when measured noise power moves into an adjacent bin.

19. The bi-directional hands-free communication device of claim 18, wherein the volume of the speaker is increased when the noise power moves into an adjacent higher bin during a sampling interval.

20. The bi-directional hands-free communication device of claim 19, wherein the volume of the speaker is decreased when the noise power moves into an adjacent lower bin during a sampling interval.

21. The bi-directional hands-free communication device of claim 18, wherein a scaling mark is generated based on the dividing of the range of the expected ambient noise power into adjacent consecutive bins, and multi-stage hysterises is used to prevent rapid changes to the scaling mark.

* * * * *